(12) United States Patent
Caine

(10) Patent No.: US 9,443,621 B2
(45) Date of Patent: Sep. 13, 2016

(54) METHOD OF ADJUSTING OXYGEN CONCENTRATION OF REACTOR WATER SAMPLES USING DEMINERALIZED WATER

(75) Inventor: Thomas A. Caine, Sunol, CA (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 80 days.

(21) Appl. No.: 13/242,392

(22) Filed: Sep. 23, 2011

(65) Prior Publication Data

US 2013/0077726 A1    Mar. 28, 2013

(51) Int. Cl.
    *G21C 17/00*    (2006.01)
    *G21C 17/022*   (2006.01)
    *G21C 19/28*    (2006.01)

(52) U.S. Cl.
    CPC ............. *G21C 17/022* (2013.01); *G21C 19/28* (2013.01)

(58) Field of Classification Search
    USPC .......................................... 376/245, 305, 306
    See application file for complete search history.

(56) References Cited

U.S. PATENT DOCUMENTS

| | | | | |
|---|---|---|---|---|
| 4,940,564 A | * | 7/1990 | Aizawa | G21C 19/28 376/306 |
| 5,398,268 A | * | 3/1995 | Ibe et al. | 376/305 |
| 5,625,656 A | | 4/1997 | Hettiarachchi | |
| 5,892,805 A | * | 4/1999 | Yamane | G21C 19/307 376/305 |
| 6,440,297 B1 | * | 8/2002 | Kim | G01N 27/423 204/400 |
| 2005/0018805 A1 | | 1/2005 | Ishida | |

FOREIGN PATENT DOCUMENTS

| | | | |
|---|---|---|---|
| JP | 62140099 A | | 6/1987 |
| JP | 03102297 A | * | 4/1991 |
| JP | H03 102297 A | | 4/1991 |
| JP | 20010133428 A | | 5/2001 |
| JP | 20040301836 A | | 10/2004 |
| JP | 20100175416 A | | 8/2010 |

OTHER PUBLICATIONS

Yeh, "A Numerical Model for Evaluating the Impact of Noble Metal Chemical Addition in Boiling Water Reactor", Nuclear Science and Engineering, vol. No. 142, Issue No. 2, pp. 220-229, Oct. 2002.*
EP Search Report issued in connection with corresponding EP Patent Application No. 121843953 dated on Sep. 3, 2013.
Unofficial English Translation of Japanese Office Action and Search Report issued in connection with corresponding JP Application No. 2012-201049 on Sep. 30, 2014.
Unofficial English Translation of Japanese Office Action issued in connection with corresponding JP Application No. 2012201049 on Jun. 2, 2015.

* cited by examiner

*Primary Examiner* — Jack W Keith
*Assistant Examiner* — Marshall O'Connor
(74) *Attorney, Agent, or Firm* — Harness, Dickey & Pierce, P.L.C.

(57) ABSTRACT

Example embodiments of the present invention relate to a method of adjusting an oxygen concentration of a reactor water side stream in a nuclear plant. The method may include injecting demineralized water into the reactor water side stream to produce an oxygenated stream with an increased oxygen concentration. The oxygenated stream may be tested to determine the effect of a process treatment on the reactor system.

20 Claims, 2 Drawing Sheets

Inject demineralized water into a reactor water side stream to produce an oxygenated stream    S100

Test the oxygenated stream to determine the effect of a process treatment on the reactor system    S120

METHOD OF ADJUSTING OXYGEN CONCENTRATION OF REACTOR WATER SAMPLES USING DEMINERALIZED WATER

BACKGROUND

1. Field

The present disclosure relates to methods of adding oxygen to reactor water sample flows.

2. Description of Related Art

In certain reactor situations, the addition of oxygen to a reactor water sample flow is desired. Conventionally, the addition of oxygen in such situations involves the bubbling of oxygen gas into the reactor water sample flow, wherein the oxygen gas is supplied from a compressed source (e.g., bottled oxygen). However, the use of bottled oxygen raises serious safety concerns because of its relatively highly pressurized state.

SUMMARY

Example embodiments of the present invention relate to a method of adjusting an oxygen concentration of a reactor water side stream in a nuclear plant. The method may include injecting demineralized water into the reactor water side stream to produce an oxygenated stream with an increased oxygen concentration.

The injecting demineralized water step may include adding demineralized water with a known oxygen concentration of at least 20 times more oxygen than the reactor water side stream. The injecting demineralized water step may include adding demineralized water to the reactor water side stream, the reactor water side stream having less than 100 ppb oxygen. The injecting demineralized water step may include adding demineralized water with at least 2000 ppb oxygen to the reactor water side stream.

The injecting demineralized water step may include adjusting a flow rate of the demineralized water such that a temperature of the oxygenated stream is at least 400° F. after injecting the demineralized water. The injecting demineralized water step may include adjusting a flow rate of the demineralized water such that a hydrogen-to-oxygen molar ratio in the oxygenated stream is greater than 2 after injecting the demineralized water.

The injecting demineralized water step may include adding the demineralized water at a point downstream from a reactor and upstream from a clean-up system. The injecting demineralized water step may include adding the demineralized water at a point downstream from a reactor and upstream from a recirculation system. The injecting demineralized water step may include adding the demineralized water at a point upstream from a catalytic mitigation monitoring system (MMS).

The injecting demineralized water step may include adding the demineralized water into a pipe carrying the reactor water side stream at a point that is a distance of at least 10 times a diameter of the pipe upstream from an electrochemical corrosion potential (ECP) sensor. The injecting demineralized water step may include adding the demineralized water at a flow rate that is 10% or less of a flow rate of the reactor water side stream.

The injecting demineralized water step may include adding the demineralized water before an injection of a noble metal and while an electrochemical corrosion potential (ECP) is being measured so as to determine a catalytic effect of the noble metal. The injecting demineralized water step may include adding the demineralized water during an injection of a noble metal and while an electrochemical corrosion potential (ECP) is being measured so as to determine a catalytic effect of the noble metal. The injecting demineralized water step may include adding the demineralized water after an injection of a noble metal and while an electrochemical corrosion potential (ECP) is being measured so as to determine a catalytic effect of the noble metal.

The injecting demineralized water step may include adding demineralized water in liquid form. The injecting demineralized water step may include adding demineralized water that has been produced on site at the nuclear plant. The injecting demineralized water step may include pumping the demineralized water into the reactor water side stream with a positive displacement pump.

Example embodiments of the present invention also relate to a method of determining a catalytic effect of a noble metal deposited within a reactor system. The method may include injecting demineralized water into a reactor water side stream to produce an oxygenated stream with an increased oxygen concentration such that a hydrogen-to-oxygen molar ratio of the oxygenated stream is less than infinity; and performing a plurality of electrochemical corrosion potential (ECP) measurements on the oxygenated stream to determine the catalytic effect of the noble metal deposited within the reactor system.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
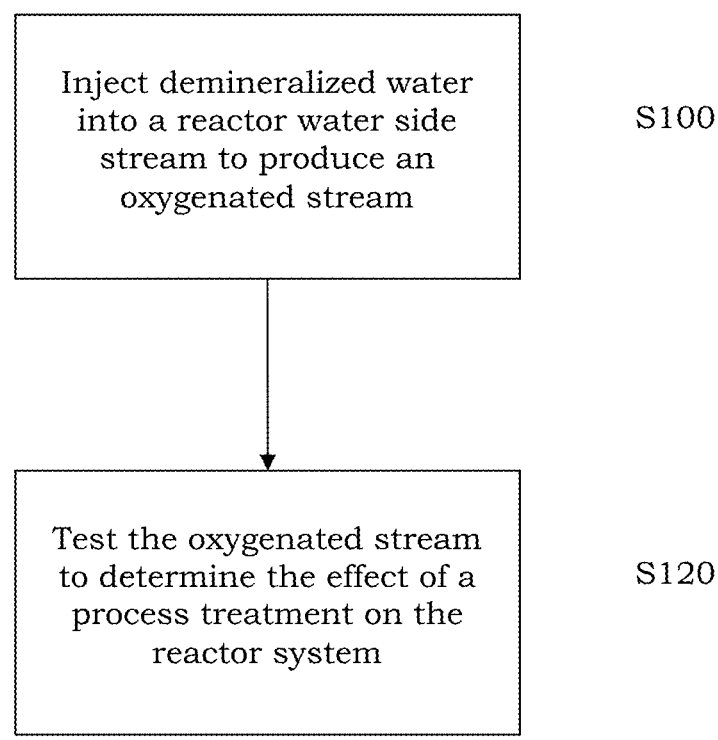
FIG. 1 is a flow chart showing a method of adjusting an oxygen concentration of a reactor water side stream according to a non-limiting embodiment of the present invention.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Example embodiments of the present invention relate to the addition of oxygen to reactor water samples. In particular, the methods according to example embodiments utilize demineralized water to adjust an oxygen concentration of a reactor water side stream, wherein the reactor water side stream may be a reactor water sample flow. It should be understood that demineralized water is also known to those ordinarily skilled in the art as deionized (DI) water. Demineralized or deionized water is water that has had its mineral ions removed (such as cations from sodium, calcium, iron, copper and anions such as chloride and bromide). Water may be demineralized or deionized using ion exchange resins which bind to and filter out the mineral salts from the water. As used herein, it should be understood that demineralized water means deionized water and vice versa.

FIG. 1 is a flow chart showing a method of adjusting an oxygen concentration of a reactor water side stream according to a non-limiting embodiment of the present invention. Referring to step S100 in FIG. 1, demineralized water may be injected into a reactor water side stream to produce an oxygenated stream. It should be understood that the demineralized water is injected in liquid form (as opposed to a gaseous state). The demineralized water may be injected at a point downstream from a reactor and upstream from a clean-up system. The demineralized water may also be injected at a point downstream from a reactor and upstream from a recirculation system. The presence of the additional oxygen introduced by the demineralized water and a subsequent change in the concentration of the oxygen may be measured and analyzed. As indicated in step S120 of FIG. 1, the oxygenated stream may be tested to determine the effect of a process treatment on the reactor system.

Figure 2:
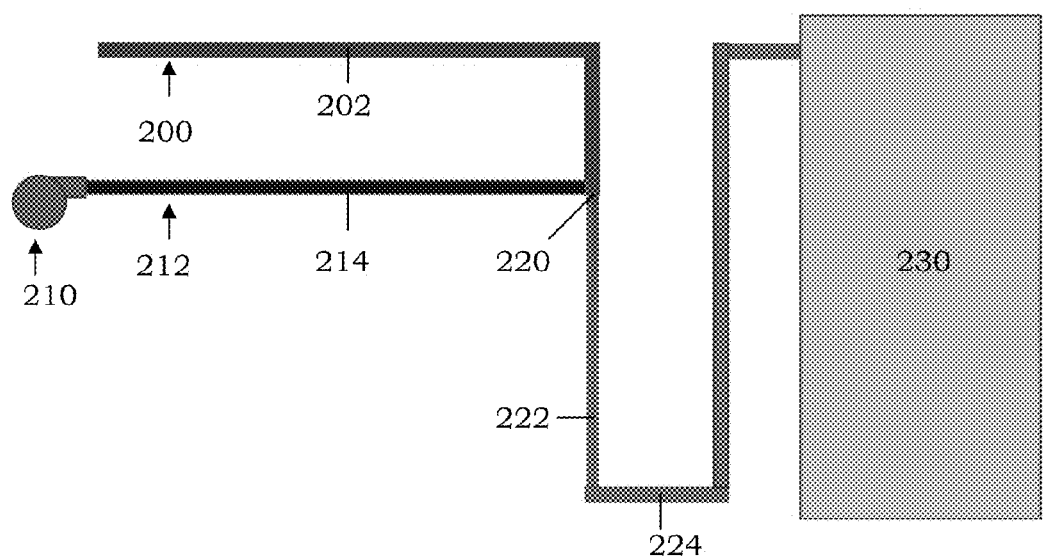
FIG. 2 is a diagram illustrating a method of adjusting an oxygen concentration of a reactor water side stream according to a non-limiting embodiment of the present invention.

FIG. 2 is a diagram illustrating a method of adjusting an oxygen concentration of a reactor water side stream according to a non-limiting embodiment of the present invention. In a nuclear plant, a method of adjusting an oxygen concentration of a reactor water side stream may involve injecting demineralized water into the reactor water side stream to produce an oxygenated stream with an increased oxygen concentration.

Referring to FIG. 2, a nuclear plant may include a reactor water piping 200 that runs from a reactor (not shown) to a monitoring system 230. For instance, the reactor water piping 200 may be connected to the bottom of the reactor (not shown). A reactor water side stream 202 flows from the reactor (not shown) to the monitoring system 230 by way of the reactor water piping 200. The reactor water side stream 202 may be used as a sample flow.

A demineralized water piping 212 runs from a demineralized water supply (not shown) to the reactor water piping 200. The demineralized water supply (not shown) is produced on site at the nuclear plant. The demineralized water supply (not shown) may be produced specifically to provide a demineralized water stream 214 in the demineralized water piping 212. Alternatively, the demineralized water supply (not shown) may be an existing supply that provides demineralized water for various uses within the nuclear plant, wherein a portion of the supply is diverted by the demineralized water piping 212.

Compared to untreated water, demineralized water has a higher resistivity and lower conductivity due to the removal of the mineral ions therein. For instance, demineralized water may have a resistivity of at least 0.1 MΩ·cm and a conductivity of at most 10 $\mu S \cdot cm^{-1}$. In another instance, demineralized water may have a resistivity of at least 1.0 MΩ·cm and a conductivity of at most 1 $\mu S \cdot cm^{-1}$. Demineralized water also has a relatively high oxygen content compared to untreated water. For instance, demineralized water may have at least 2000 ppb $O_2$ and up to 8000 ppb $O_2$ when air saturated.

The demineralized water piping 212 is connected to the reactor water piping 200 at an injection point 220. During injection of the demineralized water, the demineralized water stream 214 may be introduced into the reactor water side stream 202 with a pump 210. The pump 210 may be a positive displacement pump, although example embodiments are not limited thereto. The demineralized water may be pumped into the reactor water piping 200 at pressures ranging from 100 psig to over 1000 psig (e.g., 1100 psig).

Assuming the reactor water piping 200 has a certain diameter at the injection point 220, the mixing of the reactor water side stream 202 and the demineralized water stream 214 may be complete about 10 to 20 diameters downstream from the injection point 220 to produce an oxygenated stream 224. Thus, the mixing may be complete at an oxygenated point 222 which is downstream from the injection point 220 and upstream from the monitoring system 230. That being said, the length of the reactor water piping 200 extending from the injection point 220 to the monitoring system 230 will be longer than the length of the reactor water piping 200 extending from the injection point 220 to the oxygenated point 222. Stated more clearly, a minimum length of the portion of the reactor water piping 200 that is downstream from the injection point 220 is the distance between the injection point 220 and the oxygenated point 222.

The reactor water side stream 202 may have an oxygen concentration that is less than about 100 ppb. In contrast, the demineralized water stream 214 may have an oxygen concentration ranging from about 2000 to 8000 ppb (e.g., 5000 ppb). Thus, the demineralized water stream 214 may have a known oxygen concentration that is 20 to 80 times higher than that of the reactor water side stream 202. That being said, the addition of a relatively small amount of demineralized water to the reactor water side stream 202 can increase the oxygen concentration of the resulting mixture rather significantly. For example, the demineralized water stream 214 may be added at a flow rate that is 10% or less of a flow rate of the reactor water side stream 202. In a non-limiting embodiment, to add 100 ppb oxygen to the reactor water side stream 202, a demineralized water stream 214 with 8000 ppb oxygen may be added at a flow rate that is about 1.25% that of the reactor water side stream 202.

The resulting temperature of the oxygenated stream 224 may also be taken into account to ensure proper functioning of the monitoring system 230. For instance, the flow rate of the demineralized water stream 214 may be adjusted such that a temperature of the oxygenated stream 224 is at least 400° F. after injecting the demineralized water, although example embodiments are not limited thereto. In a non-limiting embodiment, the temperature of the reactor water side stream 202 may be about 520° F., while the temperature of the demineralized water stream 214 may be less than about 200° F. (e.g., 100° F.). Accordingly, the flow rate of the demineralized water stream 214 may be adjusted such that a resulting temperature of the oxygenated stream 224 exceeds what is needed for accurate operation of the monitoring system 230.

The monitoring system 230 may be a catalytic mitigation monitoring system (MMS). In a reactor system such as a boiling water reactor (BWR) system, oxygen ions ($O^{2-}$) are present as a result of the reactor environment and may react with the metal piping in the system so as to cause stress corrosion cracking. One solution for addressing the issue of stress corrosion cracking is an On-line NobleChem (OLNC) process.

During an On-line NobleChem process, a chemical containing a noble metal such as platinum is injected into the reactor water where the chemical decomposes and releases the platinum so as to form platinum deposits on inner surfaces of the system piping. As a result, the platinum acts as a catalyst for the recombination of the hydrogen ions ($H^+$) and oxygen ions ($O^{2-}$) to form water ($H_2O$), thereby reducing the amount of oxygen ions ($O^{2-}$) in the system, which, in turn, mitigates or prevents the occurrence of stress corrosion cracking. An On-line NobleChem process may be performed as frequently as needed (e.g., every year) to ensure that the inner surfaces of the system piping (as well as any new cracks) have been adequately coated with the platinum.

To evaluate the effectiveness of an On-line NobleChem process, a monitoring system 230 may be used, which may be in the form of a catalytic mitigation monitoring system. The monitoring system 230 may include sensors for measuring various properties, including an electrochemical corrosion potential (ECP), of the reactor water. For instance, the electrochemical corrosion potential of the reactor water may be −200 mV before platinum injection and −500 mV after platinum injection, although example embodiments are not limited thereto.

However, in certain situations, the electrochemical corrosion potential may already be −500 mV before the platinum injection. In other situations, the electrochemical corrosion potential may remain unchanged even after the platinum injection. In the above situations, it is believed that the line length and/or flow rate may be such that a majority or all of the oxygen in the reactor water may have already been consumed (e.g., by the piping) before the oxygen even has a chance to reach the monitoring system. Thus, a subsequent electrochemical corrosion potential measurement by the monitoring system may be relatively low due to the lack of oxygen in the reactor water as opposed to the catalytic recombination of the oxygen with hydrogen.

In view of the above, to ensure that an electrochemical corrosion potential measurement of the reactor water side stream 202 can be used as a direct assessment of mitigation, oxygen may be added to the reactor water side stream 202 by way of the demineralized water stream 214. In particular, the oxygen addition would increase the electrochemical corrosion potential of the oxygenated stream 224 before the platinum injection, thereby allowing a subsequent decrease in the electrochemical corrosion potential to be associated with the catalytic effect provided by the platinum injection. As a result, the effectiveness of an On-line NobleChem process may be evaluated.

The demineralized water stream 214 may be introduced into the reactor water side stream 202 before an injection of a noble metal and while an electrochemical corrosion potential is being measured so as to determine a catalytic effect of the noble metal. Additionally, the demineralized water stream 214 may be introduced into the reactor water side stream 202 during an injection of a noble metal and while an electrochemical corrosion potential (ECP) is being measured so as to determine a catalytic effect of the noble metal. Furthermore, the demineralized water stream 214 may be introduced into the reactor water side stream 202 after an injection of a noble metal and while an electrochemical corrosion potential (ECP) is being measured so as to determine a catalytic effect of the noble metal. It should be understood that the demineralized water addition may be performed for a desired duration (e.g., a few minutes) every week or month during normal operation and/or performed continuously or hourly during a noble metal injection. While the above example has been described in connection with an On-line NobleChem process, it should be understood that example embodiments are not limited thereto and may be applied in other instances where oxygen addition is needed.

The flow rate of the demineralized water stream 214 may be adjusted such that a hydrogen-to-oxygen molar ratio in the oxygenated stream 224 is greater than 2 (e.g., ratio of 3 or 4). In a non-limiting embodiment, the hydrogen-to-oxygen molar ratio may be range from 5 to 10 and even up to 15 to 20. To ensure adequate mixing, the demineralized water stream 214 may be introduced into the reactor water piping 200 such that the injection point 220 is at a distance of at least 10 times a diameter of the reactor water piping 200 upstream from an electrochemical corrosion potential sensor in the monitoring system 230. The flow rate of the oxygenated stream 224 into the monitoring system 230 may be about 5 gpm, although example embodiments are not limited thereto.

A method of determining a catalytic effect of a noble metal deposited within a reactor system may include injecting a demineralized water stream 214 into a reactor water side stream 202 to produce an oxygenated stream 224 with an increased oxygen concentration such that a hydrogen-to-oxygen molar ratio of the oxygenated stream 224 is less than infinity. A plurality of electrochemical corrosion potential measurements may then be performed on the oxygenated stream 224 to determine the catalytic effect of the noble metal deposited within the reactor system.

In view of the above, example embodiments of the present invention provide a relatively safe, simple, and effective way of adding oxygen to a reactor water stream of a nuclear plant.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of determining a catalytic effect of a noble metal within a reactor of a nuclear plant, the method comprising:
   injecting the noble metal into a reactor water side stream, the reactor water side stream being representative of water from within the reactor, the reactor water side stream exiting the reactor and flowing to an electrochemical corrosion potential (ECP) sensor;
   increasing an electrochemical corrosion potential of the reactor water side stream by injecting demineralized water into the reactor water side stream to produce an oxygenated stream with an increased oxygen concentration; and
   determining the catalytic effect of the noble metal deposited within the reactor by performing a plurality of electrochemical corrosion potential (ECP) measurements on the oxygenated stream and assessing a subsequent decrease in the electrochemical corrosion potential.

2. The method of claim 1, wherein the injecting demineralized water step includes adding demineralized water with a known oxygen concentration of at least 20 times more oxygen than the reactor water side stream.

3. The method of claim 1, wherein the injecting demineralized water step includes adding demineralized water to the reactor water side stream, the reactor water side stream having less than 100 ppb oxygen.

4. The method of claim 1, wherein the injecting demineralized water step includes adding demineralized water with at least 2000 ppb oxygen to the reactor water side stream.

5. The method of claim 1, wherein the injecting demineralized water step includes adjusting a flow rate of the demineralized water such that a temperature of the oxygenated stream is at least 400° F. after injecting the demineralized water.

6. The method of claim 1, wherein the injecting demineralized water step includes adjusting a flow rate of the demineralized water such that a hydrogen-to-oxygen molar ratio in the oxygenated stream is greater than 2 after injecting the demineralized water.

7. The method of claim 1, wherein the injecting demineralized water step includes adding the demineralized water at a point upstream from a clean-up system.

8. The method of claim 1, wherein the injecting demineralized water step includes adding the demineralized water at a point upstream from a recirculation system.

9. The method of claim 1, wherein the injecting demineralized water step includes adding the demineralized water at a point upstream from a catalytic mitigation monitoring system (MMS).

10. The method of claim 1, wherein the injecting demineralized water step includes adding the demineralized water into a pipe carrying the reactor water side stream, the pipe being connected to the electrochemical corrosion potential (ECP) sensor, the adding being performed at a point upstream from the electrochemical corrosion potential (ECP) sensor, the point being at a distance of at least 10 times a diameter of the pipe.

11. The method of claim 1, wherein the injecting demineralized water step includes adding the demineralized water at a flow rate that is 10% or less of a flow rate of the reactor water side stream.

12. The method of claim 1,
   wherein the injecting demineralized water step includes adding the demineralized water before the injection of the noble metal and while the electrochemical corrosion potential (ECP) is being measured so as to determine the catalytic effect of the noble metal.

13. The method of claim 1, wherein the injecting demineralized water step includes adding the demineralized water during an injection of the noble metal and while the electrochemical corrosion potential (ECP) is being measured so as to determine the catalytic effect of the noble metal.

14. The method of claim 1, wherein the injecting demineralized water step includes adding the demineralized water after an injection of the noble metal and while the electrochemical corrosion potential (ECP) is being measured so as to determine the catalytic effect of the noble metal.

15. The method of claim 1, wherein the injecting demineralized water step includes adding demineralized water in liquid form.

16. The method of claim 1, wherein the injecting demineralized water step includes adding demineralized water that has been produced on site at the nuclear plant.

17. The method of claim 1, wherein the injecting demineralized water step includes pumping the demineralized water into the reactor water side stream with a positive displacement pump.

18. A method of determining a catalytic effect of a noble metal deposited within a reactor system, the method comprising:
   injecting demineralized water into a reactor water side stream to produce an oxygenated stream with an increased oxygen concentration and an increased electrochemical corrosion potential such that a hydrogen-to-oxygen molar ratio of the oxygenated stream is less than infinity the reactor water side stream being representative of water from within a reactor of the reactor system, the reactor water side stream exiting the reactor and flowing to an electrochemical corrosion potential (ECP) sensor; and determining the catalytic effect of the noble metal deposited within the reactor system by performing a plurality of electrochemical corrosion potential (ECP) measurements on the oxygenated stream and assessing a subsequent decrease in the electrochemical corrosion potential.

19. The method of claim 1, wherein the injecting demineralized water step includes the demineralized water having a resistivity of at least 0.1 MΩ·cm and a conductivity of at most 1 µS·cm$^{-1}$.

20. The method of claim 1, wherein the injecting demineralized water step includes the demineralized water having a resistivity of at least 0.1 MΩ·cm and a conductivity of at most 1 µS·cm$^{-1}$.

* * * * *